United States Patent
Vokey

(10) Patent No.: US 7,847,560 B2
(45) Date of Patent: Dec. 7, 2010

(54) METHOD TO DETECT AND LOCATE A BREACH IN VERTICAL OR HORIZONTAL INTERSECTIONS IN A MEMBRANE OF A ROOF

(75) Inventor: David E. Vokey, Sidney (CA)

(73) Assignee: Detec Systems LLC., Sidney, British Columbia (CA)

( * ) Notice: Subject to any disclaimer, the term of this patent is extended or adjusted under 35 U.S.C. 154(b) by 478 days.

(21) Appl. No.: 12/030,277

(22) Filed: Feb. 13, 2008

(65) Prior Publication Data

US 2009/0199506 A1 Aug. 13, 2009

(51) Int. Cl.
G01R 31/08 (2006.01)
G01R 27/08 (2006.01)
G01N 27/00 (2006.01)

(52) U.S. Cl. .................. 324/523; 324/718; 324/557
(58) Field of Classification Search ............... 324/523, 324/718, 557
See application file for complete search history.

(56) References Cited

U.S. PATENT DOCUMENTS

| | | | |
|---|---|---|---|
| 4,543,525 A * | 9/1985 | Boryta et al. ............... 324/559 |
| 4,565,965 A | 1/1986 | Geesen | |
| 4,598,273 A * | 7/1986 | Bryan et al. ........... 340/539.26 |
| 7,554,345 B2 * | 6/2009 | Vokey ....................... 324/718 |
| 7,602,196 B2 * | 10/2009 | Vokey ....................... 324/718 |
| 7,652,481 B2 * | 1/2010 | Vokey ....................... 324/523 |
| 2005/0057258 A1 * | 3/2005 | Colahan et al. ............. 324/501 |
| 2008/0143349 A1 * | 6/2008 | Lorenz et al. ............... 324/691 |

* cited by examiner

*Primary Examiner*—Jeff Natalini
(74) *Attorney, Agent, or Firm*—Adrian D. Battison; Ade & Company Inc.

(57) ABSTRACT

A defect in a horizontal or vertical seam at the edge of a roof membrane is detected by applying a DC voltage between the roof deck a probe in the form of a flexible wetted sponge and wiping the sponge probe over the seams. The current to the probe is detected and indicated to the operator so that the operator may determine a maximum current at the defect. The receiver provides an audible signal emitter to the operator and includes a calibration circuit arranged to automatically maintain, despite changes in voltage applied between the roof deck and the peripheral conductor, a "0" set calibration point so as to indicate at the calibration point when zero difference in voltage is detected. Conductors can be applied to the membrane to define an area to be tested within the conductors.

19 Claims, 6 Drawing Sheets

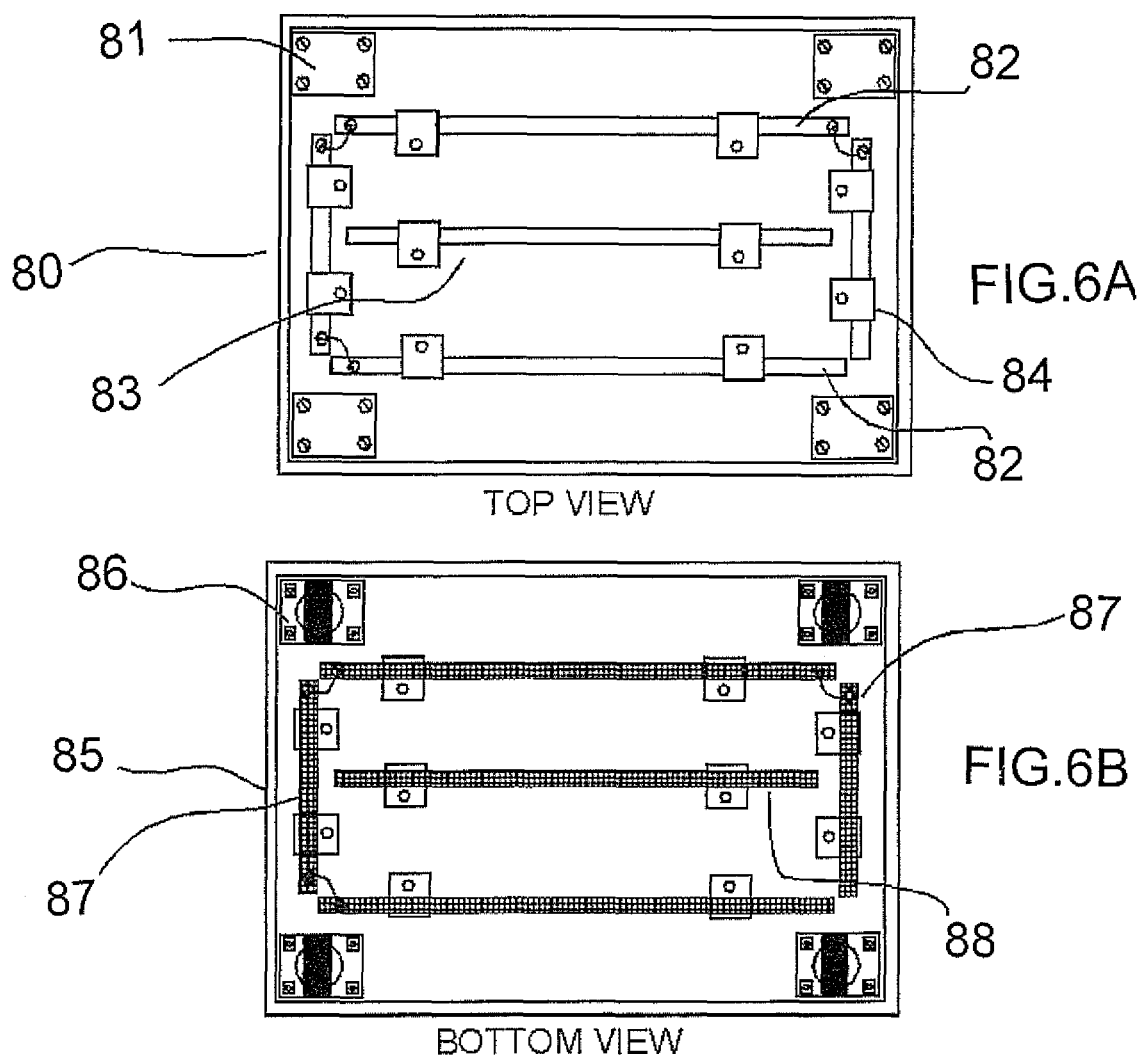

METHOD TO DETECT AND LOCATE A BREACH IN VERTICAL OR HORIZONTAL INTERSECTIONS IN A MEMBRANE OF A ROOF

The present invention relates to a system for testing roof membranes to detect and locate damage and moisture penetration in the vertical and corner intersection surfaces of roof membranes. It has particular application to testing the integrity of vertical and sloped surfaces of residential and commercial buildings.

This application is related to U.S. application Ser. No. 12/020,935 filed 28 Jan. 2008 and entitled A METHOD AND APPARATUS TO DETECT AND LOCATE A BREACH IN A ROOF MEMBRANE.

This application is related to U.S. application Ser. No. 11/949,437 filed 3 Dec. 2007 and entitled METHOD AND APPARATUS TO DETECT AND LOCATE DAMAGE AND BREACHES IN ROOF MEMBRANES.

BACKGROUND OF THE INVENTION

The failure to detect, find, and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from the contraction and expansion of roof decks and natural aging processes.

Several methods have been used to try and locate roof leaks after they have occurred. Electric capacitance meters identify leaks using a low-frequency method that measures dielectric constant changes in the roofing material as a result of moisture below the membrane. Infrared cameras allow technicians to scan roof surfaces for temperature differentials that signify moist areas through changes in thermal conductivity or evaporation. These methods are typically used in forensic analysis only after significant leakage has occurred.

Electric field mapping uses a wire loop around the perimeter of the roof surface to introduce an electric potential between the structural deck and a selected roof area which is sprayed with water. The electric field potential caused by a conductive path to any roof membrane damage is then located using a voltmeter and a pair of probes.

U.S. Pat. No. 4,565,965 issued Jan. 21, 1986 to Geesen discloses an electric field mapping arrangement for detecting leaks in flat roofs in which electrical pulses are transmitted through the moisture in the leak to the roof edge. The roof is then scanned by a pulse sensor and hand-held probe rods to find the leak by locating the maximum amplitude. The disclosure of this prior patent is incorporated herein by reference.

The method as described by Geesen is applicable on horizontal low slope or flat surfaces only and does not allow the testing of corner or wall intersection areas.

SUMMARY OF THE INVENTION

It is an object of the present invention to provide an apparatus and method for the detection and location of moisture penetration at horizontal and/or vertical intersections and on the vertical or sloped surfaces of roof membranes.

According to a first aspect of the invention there is provided a method of locating a defect in the vertical or horizontal intersections of a roof membrane, the method comprising:

providing a ground connection to the roof deck applying a voltage between the roof deck and a wet sponge like sensor probe;

using a wet sponge like sensor probe and engaging the probe with the roof membrane at vertical seams and joints on the membrane to detect a leakage signal generated by current flowing between the roof deck and the sponge like probe;

providing a receiver which acts to detect the leakage current between the probe and wall or roof deck;

the receiver being arranged to provide to an operator controlling the location of the probe a signal indicative of the leakage current so as to allow the operator to locate the defect by moving the probe to different locations;

wherein the probe is mounted on an insulated rigid base with a suitable handle or pole such that the wet sponge like probe can be pressed against the surface being tested while insulating the technician from the conducting probe.

The voltage applied is preferably a DC voltage but an AC signal could also work. There are several ways to implement an AC detection circuit and one could overcome any potential DC offsets from half-cell potentials. However DC works well and is easier. The above patent of Geesen, the disclosure of which is incorporated herein by reference, proposes an arrangement by which an AC signal can be used and a person skilled in the art can adapt such an arrangement to the present construction.

Typically, the test described and claimed herein is carried out on a membrane before any overburden such as gravel or pavers are placed on top. In this case all the seams. near the wall/roof deck interface and on the vertical portions of the parapet are tested using the technique. After this test the carriage arrangement described herein is used to test the main area of the horizontal roof membrane.

The further technique of the framed probes described herein is used when the deck is covered with an overburden or garden and the membrane is covered.

Preferably the receiver includes a variable sensitivity and an analog display for the differences in current detected.

Preferably the receiver provides an audible signal emitter such that a signal indicating the maximum leakage current detected can be determined audibly.

Preferably the audible signal emitter includes a voltage to frequency converter.

If required there may be provided an external connection to the receiver common ground to form an external grounding or screening connection to allow electrical isolation of the area under test.

Thus un-insulated wire or metal foil can be placed on the membrane at the end or ends of the area to be tested;

In this way, the un-insulated wire or metal foil connected to the common ground by a connecting lead acts so as to block and ground any leakage current outside of the area under test so that the probe will only detect any leakage current in the test area.

BRIEF DESCRIPTION OF THE DRAWINGS

One embodiment of the invention will now be described in conjunction with the accompanying drawings in which:

FIGS. 6A, 6B and 6C show respectively a top plan view, a bottom plan view and a front view of the carriage and sensing system for use in the general method of FIG. 5.

DESCRIPTION OF THE PREFERRED EMBODIMENT

The following description is taken from the above application and is included to ensure description of the complete system with which the present invention can be used.

Figure 1:
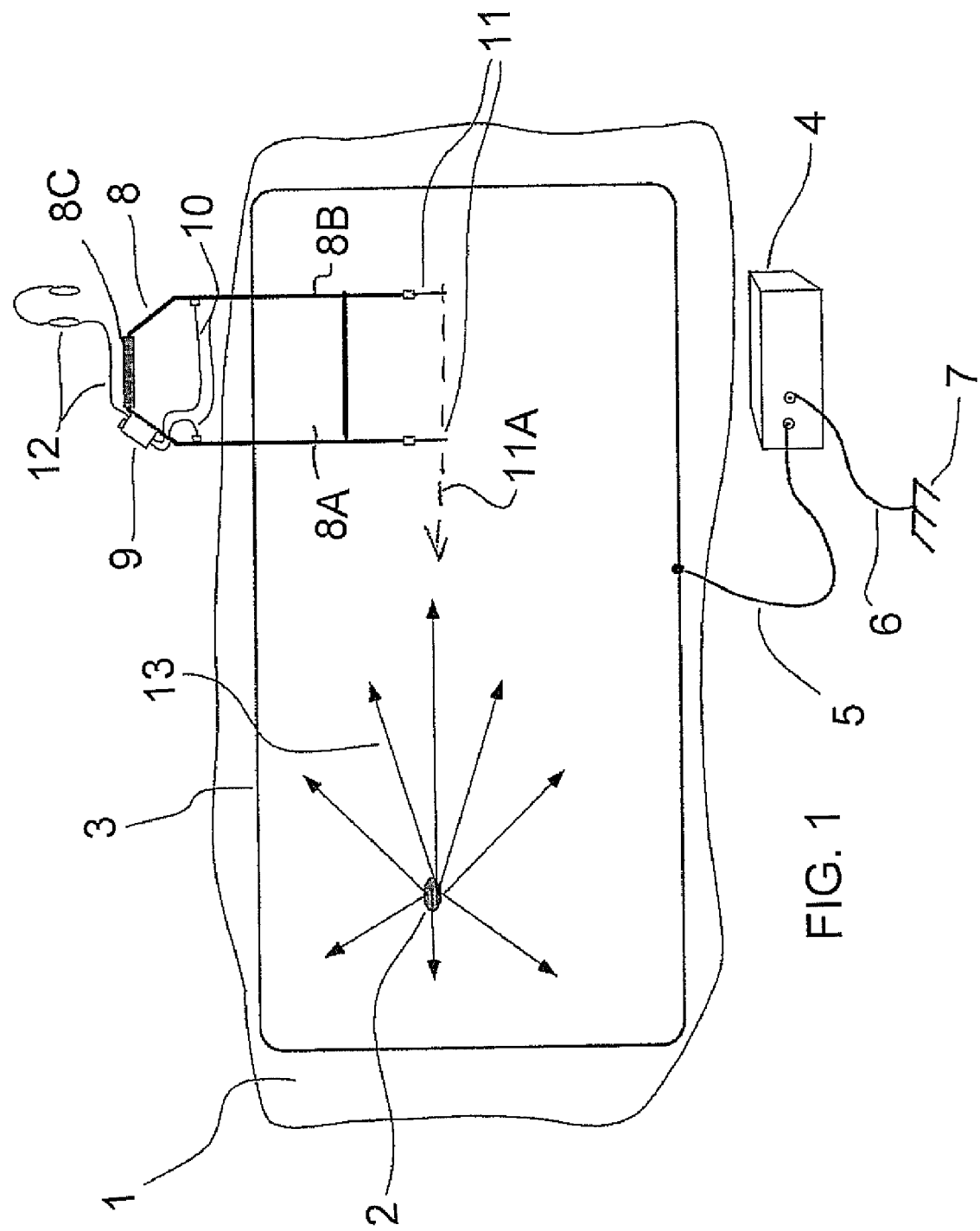
FIG. 1 is an isometric view of a frame mounted leak location system on a roof deck.

The operation of the horizontal roof membrane leak location system is shown in FIG. 1. A bare conductor 3 is placed in a closed loop on top of the roof membrane area to be tested. A DC power source 4 is connected between the roof deck and the energizing conductor 3 by a grounding cable 6 connected to a building ground point 7 on the roof deck and an energizing cable 5 connected to the loop conductor 3. The surface of the roof membrane is then sprayed with water so as to dampen the entire area 1 under test.

A probe mounting frame 8 with a receiver 9 attached to the frame is positioned within the area to be tested. Two insulated conducting probes 11 carried on the frame are connected to the input of the receiver 9, mounted on the frame, by two insulated connecting cables 10. A headphone and connecting cable 12 is plugged into the audio output jack on the receiver 9. The frame is a fixed structure which provides two legs 8A and 8B at fixed separation and position to hold the probes at a fixed spacing. The legs are carried on a handle 8C which can be grasped by a single hand of the operator to simultaneously manipulate the position and orientation of the frame and the probes.

Thus the frame includes a pair of upstanding legs onto a lower end of each of which a respective one of the probes is mounted so as to project downwardly therefrom. The frame includes a center handle portion between the legs.

An electrical circuit is formed between the roof deck via the building ground 7 and the energizing cable 3 through any roof membrane defect 2 which provides a conductive path through the membrane. With the roof circuit energized, the mounting frame 8 is positioned on the roof membrane and the probes 11 brought into electrical connection with the roof membrane so that current flows to the two probes.

It will be appreciated that the amplitude of the current decreases along any line extending from the defect to the peripheral cable 3.

The voltage connected between the roof deck and the peripheral conductor is constant so as to generate a constant current flow rather than the use of pulses which generate a varying current due to the charging current rush at the beginning of every pulse. The difference between the currents detected by the two probes is at a maximum when a line 11A joining the probes 11 is aligned with the defect. The current is at a maximum when the probes are closest to the defect.

With the probes fixed on the frame 8, the frame is rotated by the operator until the maximum difference between the two currents is detected to provide a maximum pulse rate in the headphones 12 which corresponds to a maximum reading on the signal level meter 9. In this position, the operator knows that the line 11A joining the probes is aligned with the defect. The mounting frame is thereby brought into directional alignment with the current 13 from the defect so as to indicate the direction to the location of the defect 2. The mounting frame is then advanced in steps along that line 11A until a maximum signal level and audible pulse rate is achieved thus indicating the actual location of the defect.

Figure 3:
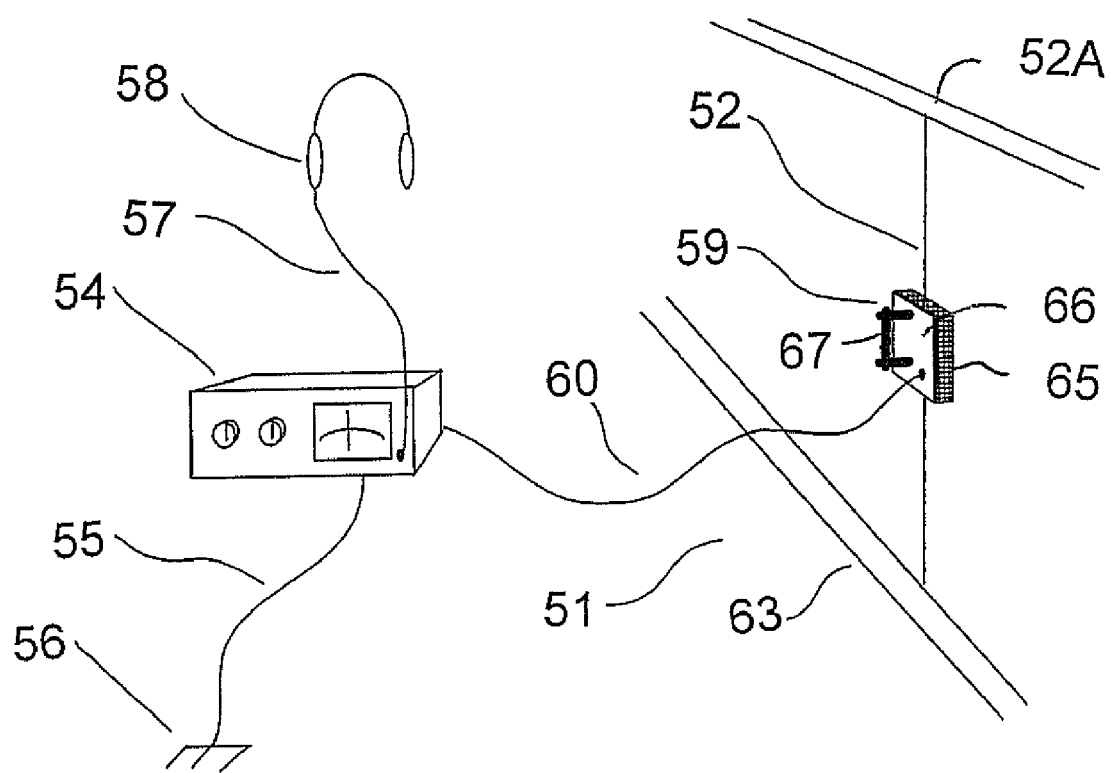
FIG. 3 is an isometric view of a leak detection probe on a vertical seam of a roof membrane.

The schematic diagram for the receiver unit is shown in FIG. 3. The two mounting frame probes 11 are connected by the insulated cables 10 to the respective input terminals 23 and 24. One side 23 is connected to the negative summing input of a first stage op-amp 28 through a resistor R1. The other side 24 is tied to circuit common. Diodes D1 and D2 provide input protection. The gain of the first stage op-amp is set by resistor R2 and potentiometer P1 while capacitor C1 filters out any unwanted noise.

The output of the first stage op-amp 28 is tied to the input of a second stage op-amp 29 through a resistor R6. Resistors R6 and R8 set the gain of the second stage op-amp 29 to unity. The positive summing input of the second stage op-amp 29 is tied to common through a resistor R7.

A voltage-to-frequency converter 32 has an input which is connected to the output of the second stage op-amp 29. The output of the V to F converter 32 is applied to the input of an audio-amp 34 through a volume control 33. The audio output of amp 34 is connected to the headphones 12 or to a speaker 24.

The output of the second stage op-amp 29 is connected to voltage limiting diodes D3 and D4 through a resistor R9. A signal level meter 31 is connected in series with a scaling resistor R10 across the diodes D3 and D4.

In order to avoid the need for zero offset adjustment of the meter circuit 31 as the supply voltage V changes, there is provided a circuit component which provides self adjustment of the common ground G of the main circuit connected to the op-amps 28 and 29. Thus the positive summing input of a third op-amp 30 is tied to the half the supply voltage point between +V and −V through equal value dividing resistors R4 and R5. The negative summing input and output port of op-amp 30 forms the circuit common G. In this way there is automatic adjustment of the circuit ground so that the meter is always centered at zero voltage difference between the probes and the meter moves away from the center position when a current difference is detected.

The above technique of the frame mounted probes is typically used when the deck is covered with an overburden or garden and the membrane is covered.

Figure 4:
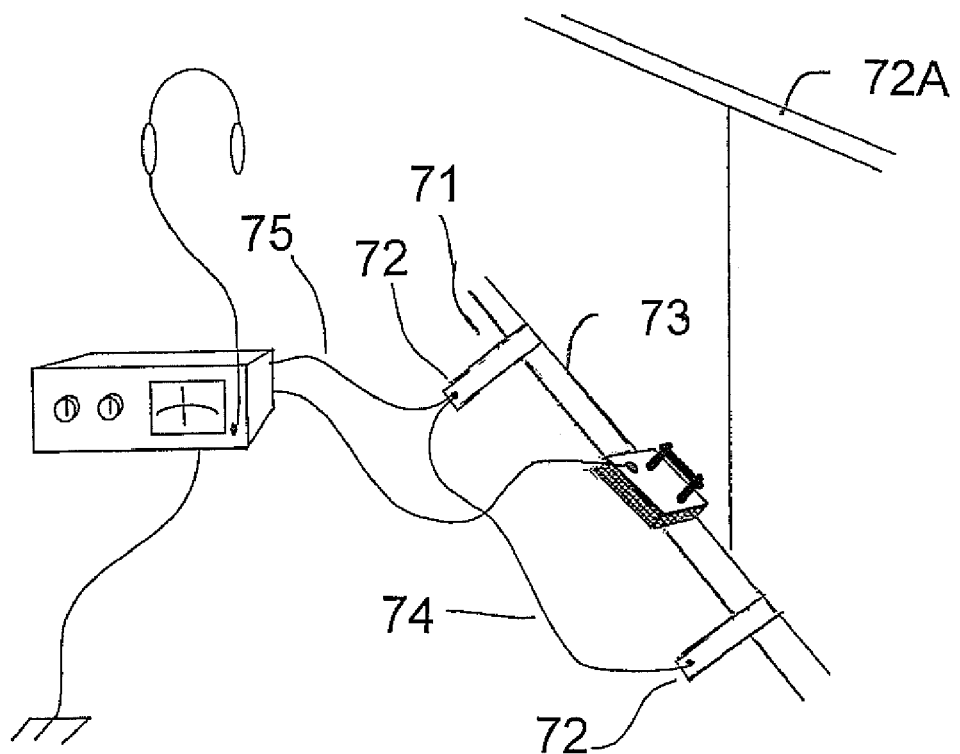
FIG. 4 is an isometric view of the leak detection probe on a horizontal seam with isolating conductors applied.

Turning now to the arrangement shown in FIGS. 3 and 4, the operation of the vertical roof membrane leak location system is shown in FIG. 3. The horizontal roof membrane 51 has a vertical membrane 52 at a roof parapet 52A. The receiver 54, which is of the construction and arrangement previously described, is operated to apply the positive side of the power supply to a building ground point 56 through a connecting cable 55. A connecting cable 57 and headphones 58 provide the audible output signal from the receiver 54.

In the example in FIG. 3, a sensor 59 in the form of a wet sponge is held against a seam on the vertical membrane. A connecting cable 60 ties the conductive wet sensor 59 to the input of the receiver 54. Moisture in the sensor 59 makes electrical contact with the membrane. Any breach in the vertical portion of the membrane will result in a conductive path forming through the breach to the parapet wall. A fault current will flow from the positively grounded building 56 through the breach to the wet sensor 59 and connecting cable 60 into the input of the receiver 54. The detection circuit of the receiver 54 as described above will generate an audible signal and meter deflection in response to the leakage current.

The same probe can be wiped over a horizontal seam at an edge of the roof.

Figure 2:
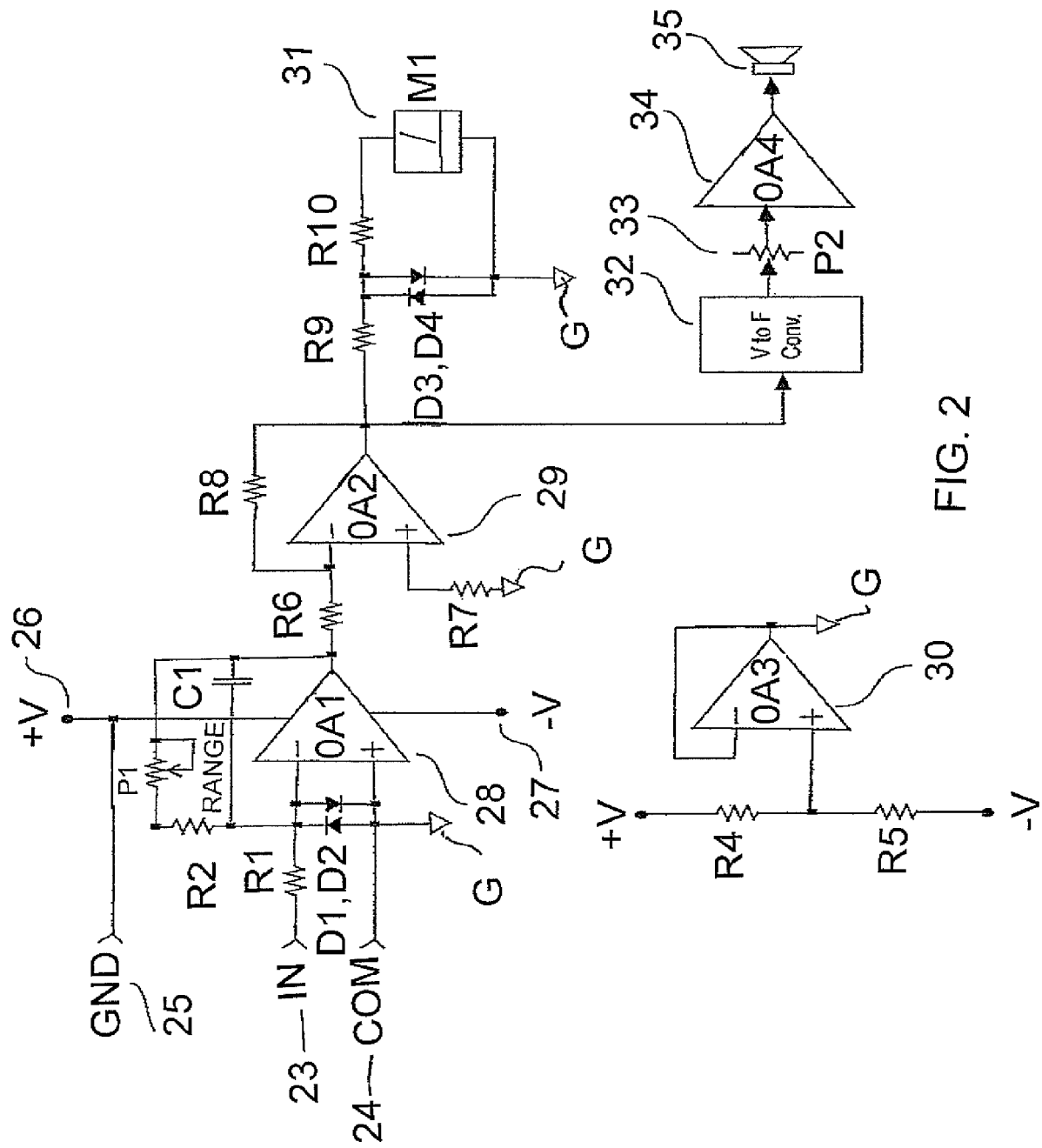
FIG. 2 is a circuit schematic of the receiver of FIG. 1 which includes an auto-zeroing receiver system and an audible alert.

The schematic diagram for the receiver unit 54 is shown in FIG. 2. The building ground is connected to the positive supply via the ground jack 26. The sensor 59 is connected via a cable 10 to the negative summing input of the first stage op-amp 28 through the input jack 23 and current limiting resistor R1. Diodes D1 and D2 provide input protection. The gain of the first stage op-amp is set by resistor R2 and potentiometer P1 while capacitor C1 filters out any unwanted noise.

The output of the first stage op-amp 28 is tied to the input of the second stage op-amp 29 through a resistor R6. Resistors R6 and R8 set the gain of the second stage op-amp OA2 to unity. The positive summing input of the second stage op-amp 29 is tied to common through a resistor R7.

The voltage-to-frequency converter 32 has an input which is connected to the output of the second stage op-amp OA2. The output of the V to F converter 32 is applied to the input of the audio-amp 34 through a volume control 33. The audio output of amp 32 is connected to the headphones 58 or to a speaker 35.

The output of the second stage op-amp 21 is connected to voltage limiting diodes D3 and D4 through a resistor R9. A signal level meter 31 is connected in series with a scaling resistor R10 across the diodes D3 and D4.

The sensor 59 comprises a sponge 65 mounted on a backing plate 66 carried on an insulating handle 67. Thus the contact from the cable 60 is connected to the conductive plate 66 for communication of current through the moisture in the sponge. However the operator moving the sensor is isolated from the current by the to insulated handle 67.

The handle can comprises a simple transverse bar at the rear of the probe or the handle can comprise an elongate pole extending from the rear of the probe allowing the operator to stand and wipe the probe over seams from a standing position.

The contact portion of the sensor 59 can comprise any flexible material which can wipe over an area to be sensed and provide contact between the material and the membrane over the whole area of the material while carrying moisture into contact with the membrane. Thus the material can be a sponge or can be a fabric such as felt or can be other materials which have the required characteristics of carrying the liquid into contact with the membrane and sufficient flexibility to deform slightly where required to remain in contact with the membrane over changes in surface height and over changes of angle.

As the peripheral conductor 3 of FIG. 1 as no effect in generating a potential difference in the area of the parapet 52A, this arrangement uses current communicating directly between the roof deck and the sponge sensor and acts to measure the absolute value of that current against a fixed comparison value provide at COM terminal 24 which is connected to the positive input of the amplifier 28.

Thus the sponge sensor acts to apply moisture to the membrane to create the conductive circuit and acts as a sensor to detect the value of the current so caused. It will be appreciated that the current will vary as the sensor is moved closer to a breach from a zero current where there is no breach to a maximum directly at the breach. The comparison with the fixed value thus locates this maximum which is communicated to the operator either using the meter 31 or the headphones 58.

In certain situations a conductive path will exist beyond the area under test due to extensive wetting of the membrane. In FIG. 4 a method to isolate the area under test is illustrated. A horizontal seam 73 next to the parapet wall 72A is shown with a water path 71 extending beyond the test area. A metallic strip 72 is placed across the water path 71 on one end of the area to be tested and a second metallic strip 73 placed across the other end of the area to be tested. The metallic strips are connected to the circuit common ground via cables 74 and 75. Any fault current flowing along the water path from membrane breaches outside of the test area is isolated by the metallic strips thereby isolating the test area.

Typically, the test described above is carried out on a membrane before any overburden such as gravel or pavers are placed on top. In this case all the seams. near the wall/roof deck interface and on the vertical portions of the parapet are tested using the technique.

After this test, the carriage arrangement described below is used to test the main area of the horizontal roof membrane.

Figure 5:
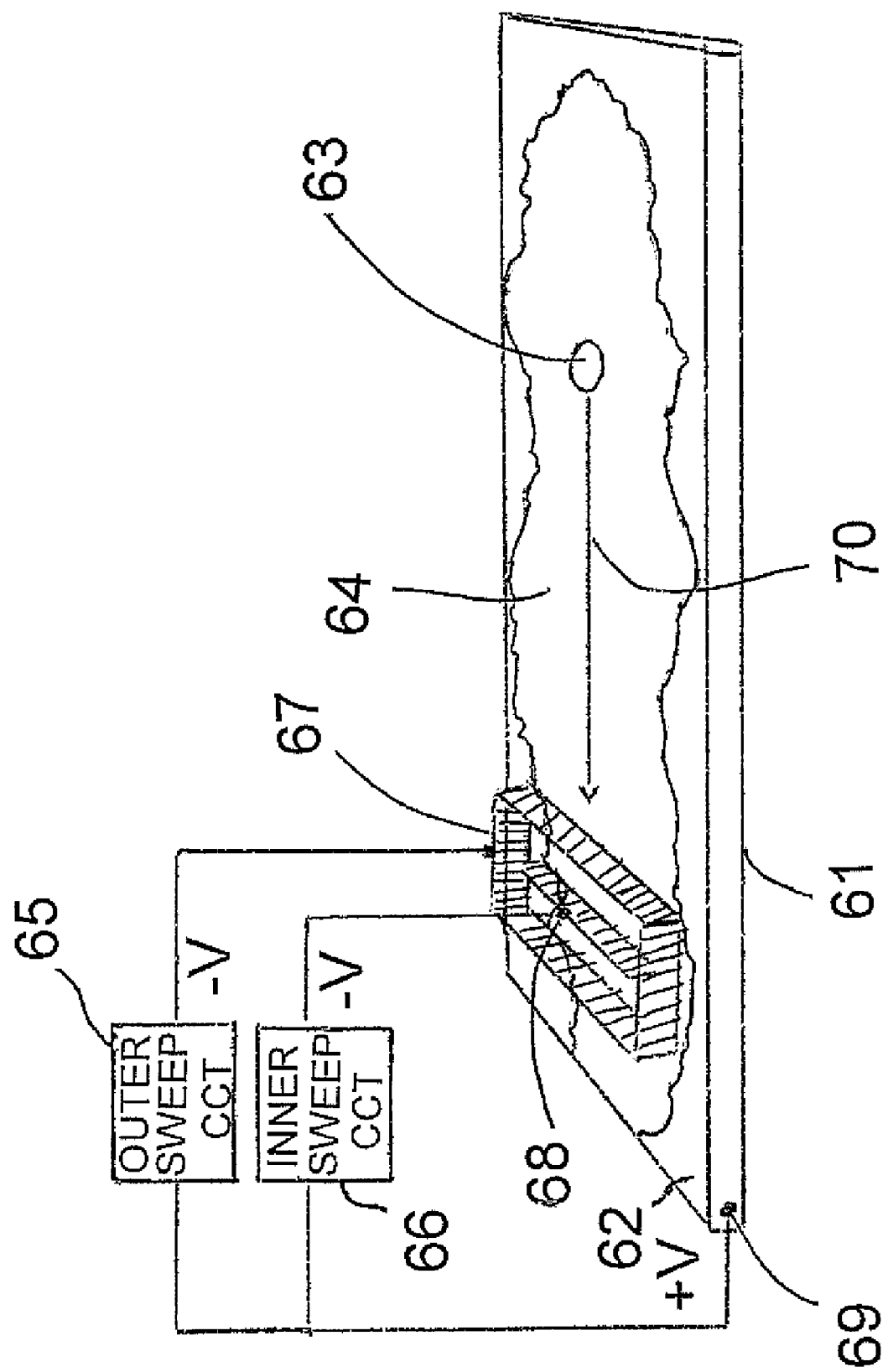
FIG. 5 is an isometric view of a roof membrane on a roof deck including a basic illustration of a carriage arrangement for use in carrying out a test on the main body of the membrane.

The overall arrangement of the carriage arrangement can best be seen with reference to FIG. 5. A roof membrane 62 is illustrated which is applied as a direct covering layer over a concrete roof deck 61. The deck is typically of concrete to but can be of any suitable material to provide the necessary structural strength and can be steel or wood. The membrane is an impervious material such as plastics and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

A defect in the membrane 63 allows water 4 to intrude and forms a conductive path to the roof deck. The conductive outer 67 brushes and inner 68 brush are placed on the top surface of the membrane 62 with the outer perimeter conductive brushes 67 surrounding the inner brush 68. The brush sets are positioned so as to be in intimate contact with the wetted surface 64 of the test area. The outer sweep detection circuit 65 and inner sweep detection circuit 66 which share a common power supply are connected to the outer brush set 67 and inner brush set 68 respectively with the common positive side of both connected to a grounding point 69 on the deck.

A DC potential is applied between the roof deck 61 and the wetted area 64. At the membrane damage site 64 there is a conductive path through the membrane and a leakage current 70 travels through the damage point and back to the outer conductive brush 67. The return current picked up by the outer brushes is measured and displayed on the outer sweep circuit 65. As the outer brush perimeter surrounds the inner brush sensor, very little of the return current reaches the inner brush 68. The sweep system is then moved forward over the membrane towards the defect and when the outer brush passes over the damage site, the inner brush picks up the return current and provides a visual and audible alarm. The damage site is thereby located.

The detector circuit is substantially as shown and described above.

Figure 6C:
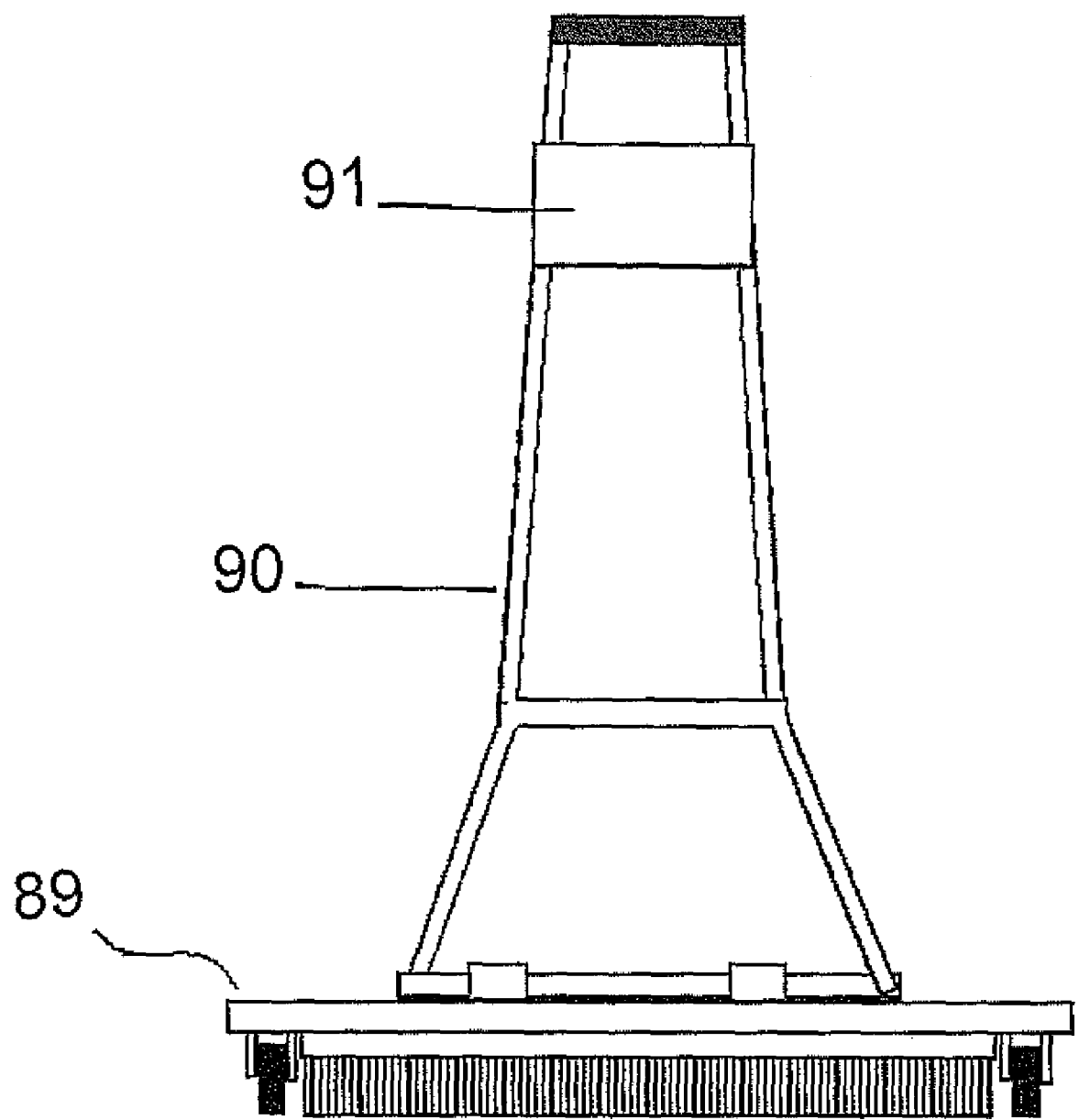

The mechanical arrangement of the apparatus is illustrated in FIGS. 6A, 6B and 6C. A horizontal platform or carriage 80 with a flat top wall and a depending side wall 85 forming four sides of a rectangular carriage. The carriage is carried on four swivel wheels or casters 81 attached to the top plate by mountings 86. The carriage supports an outer brush assemblies defined by two parallel front and rear brushes 82 and two parallel side brushes 87, thus defining a rectangular outer area just inside the outside wall of the carriage. Inside the outer rectangular area is provided a single transverse brush defining an inner brush 83. Vertically floating brackets 84 position the outer brushes and allow vertical movement of the brushes as the platform travels over the membrane surface. Similar brackets 88 carry the inner brush. The brushes are formed as a strip from conductive bristles carried on a base so that the base can float upwardly and downwardly from pressure of the roof against the tips of the bristles so that a constant electrical contact is maintained with the roof.

A simple manually graspable handle assembly 90 is attached to brackets 89 on the top plate of the carriage. The sweep circuits are mounted in a housing 91 and attached to the handle 90 assembly at a position below a top hand rail of the handle assembly.

The invention claimed is:

1. A method of locating a defect in a roof membrane covering a roof deck, the method comprising:
   providing an electrical connection to the roof deck;
   providing a sensor probe formed of a flexible pad of a material arranged to carry a conductive liquid;
   wherein the probe is mounted on an insulated handle such that the probe can be pressed against the surface being tested by manual operation of the handle by the operator while insulating the operator from the conducting probe;
   applying a voltage between the roof deck and the sensor probe;
   engaging the probe with the roof membrane such that the conductive liquid is wiped over the membrane;
   detecting the current between the probe and roof deck;
   and providing to an operator controlling the location of the probe a signal indicative of the current so as to allow the operator to locate the defect by moving the probe to different locations.

2. The method according to claim 1 wherein the current is detected by a receiver which includes a variable sensitivity and an analog display for the differences in current detected.

3. The method according to claim 1 or 2 wherein the current is detected by a receiver which provides an audible signal emitter such that a signal indicating the maximum leakage current detected can be determined audibly.

4. The method according to claim 3 wherein the audible signal emitter includes a voltage to frequency converter.

5. The method according to any one of claims 1 to 4 including generating a potential difference between shielding conductors adjacent the probe and the roof support deck such that currents generated through the membrane are drawn to the shielding conductors so as to create a shielding zone around the probe.

6. The method according to claim 5 wherein the shielding conductors comprise un-insulated wire or metal foil on the membrane at the end or ends of the shielding zone.

7. The method according to claim 1 wherein the current is detected by a receiver which includes a calibration circuit arranged to automatically maintain, despite changes in voltage applied between the roof deck and the peripheral conductor, a "0" set calibration point so as to indicate at the calibration point when zero difference in voltage is detected.

8. The method according to claim 7 wherein the calibration circuit includes an operational amplifier arranged to provide a circuit common ground from an input tied to the half the supply voltage point between +V and −V through equal value dividing resistors.

9. The method according to claim 1 wherein the handle comprises a transverse bar at the rear of the probe.

10. The method according to claim 1 wherein the handle comprises an elongate pole extending from the rear of the probe.

11. The method according to claim 1 wherein the pad is formed of sponge.

12. A method according to claim 1 wherein a part of the roof is tested by:
   providing a first conductor arrangement for engaging the roof above the membrane;
   providing a return conductor arrangement for electrical connection to the roof deck;
   generating an electrical potential between the first and return conductor arrangements;
   mounting the first conductor arrangement on a carriage which can be moved over the roof so as to scan the first conductor arrangement over selected areas of the roof while the first conductor arrangement remains in contact with the roof as the carriage is moved;
   sensing the current flowing from the roof deck to the first conductor arrangement;
   and detecting the changes in current as the first conductor arrangement is scanned over the selected areas of the roof to locate the defect in the membrane;
   so that only remaining parts are tested using the probe.

13. The method according to claim 12 wherein the carriage is mounted on roller wheels for carrying the carriage in rolling movement over the roof.

14. The method according to claim 12 wherein the carriage includes a handle such that the carriage can be manually rolled across the roof.

15. The method according to claim 12 wherein the first conductor arrangement comprises at least one conductive component arranged for engaging the roof and for sliding over the roof while in contact therewith.

16. The method according to claim 15 wherein the conductive component comprises a conductive brush.

17. The method according to claim 12 wherein the first conductor arrangement includes first and second conductor members which are electrically isolated from each other, wherein the electrical potential is arranged to be applied between both the first and second conductor members of the first conductor arrangement and the roof support deck and wherein the current flowing from the roof support deck to the first and second conductor members is independently sensed to detect the changes in current as the first conductor arrangement is scanned over the selected areas of the roof to locate the leak in the membrane.

18. The method according to claim 17 wherein there is provided a measuring and switching circuit which includes two independent leakage current detection components sharing a common power supply source.

19. The method according to claim 17 wherein the first conductor member is an inner member and the second member is an outer shielding member surrounding the first inner member with both the first inner member and the second outer member engaging the roof.

* * * * *